Oct. 15, 1963 R. H. BLACKMORE 3,107,267
ELECTRODE CONTACT APPARATUS
Filed June 22, 1961 2 Sheets-Sheet 1

INVENTOR.
RICHARD H. BLACKMORE
BY Thomas J. O'Brien
ATTORNEY

Oct. 15, 1963  R. H. BLACKMORE  3,107,267
ELECTRODE CONTACT APPARATUS
Filed June 22, 1961  2 Sheets-Sheet 2

INVENTOR.
RICHARD H. BLACKMORE

BY Thomas L. O'Brien
ATTORNEY 3,107,267
ELECTRODE CONTACT APPARATUS
Richard H. Blackmore, Ashtabula, Ohio, assignor to Union Carbide Corporation, a corporation of New York
Filed June 22, 1961, Ser. No. 118,982
5 Claims. (Cl. 13—16)

The present invention relates to an improved electrical contact mechanism for providing an efficient electrical contact at the surface of an electrode and which is capable of providing support for at least a portion of the weight of the electrode.

It is required in electric arc operations that a contact mechanism be provided for the conduction of electrical energy from a suitable source to the electrode and it is essential that the contact mechanism which is provided be efficient regardless of imperfections in the surface of the electrode and/or variation in electrode diameter. It is also most desirable that the contact mechanism provided establish a continuous and efficient electrical contact with the electrode during both normal operating conditions and during the intervals when the electrode is slipped, i.e. lowered, to replace a consumed portion thereof. It is also of advantage, under various operating conditions, that the electrode contact mechanism additionally provide support for at least a portion of the weight of the electrode so that the supporting pressures exerted on the electrode are distributed and consequently the possibility of damage to the electrode surface is minimized.

It is accordingly an object of the present invention to provide an electrode contact apparatus suitable for use with either pre-baked or self-baking electrodes.

It is another object of the present invention to provide an electrode contact apparatus which will continuously maintain an efficient electrical contact with the electrode both during normal operation and during slipping adjustments of the electrode.

It is a further object of the present invention to provide an electrode contact apparatus which is capable of supporting a substantial portion of the weight of the electrode while continuously providing an efficient electrical contact with the electrode.

Other objects will be apparent from the following description and claims in which:

Figure 4:
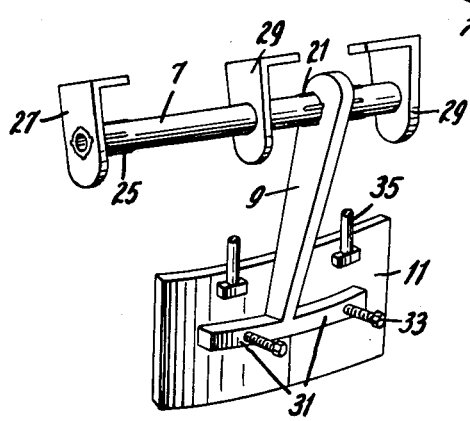

FIGURE 4 separately illustrates a portion of the contact mechanism of the present invention.

With reference to the drawing, an electrode 1, either of the pre-baked or self-baking type, is supported during normal operation by means of hinged clamps 3 and 5 and by the lower electrode contact mechanism of the present invention which comprises torsion-bars 7, rigid arms 9 and electrode contacts 11. The torsion bars are tangentially disposed about the electrode and are mounted so as to be capable of torsional deformation. A separate rigid arm is fixed, to each torsion bar, being arranged and adapted to torsionally deform its affixed bar when displaced in a direction transverse thereto.

Figure 1:
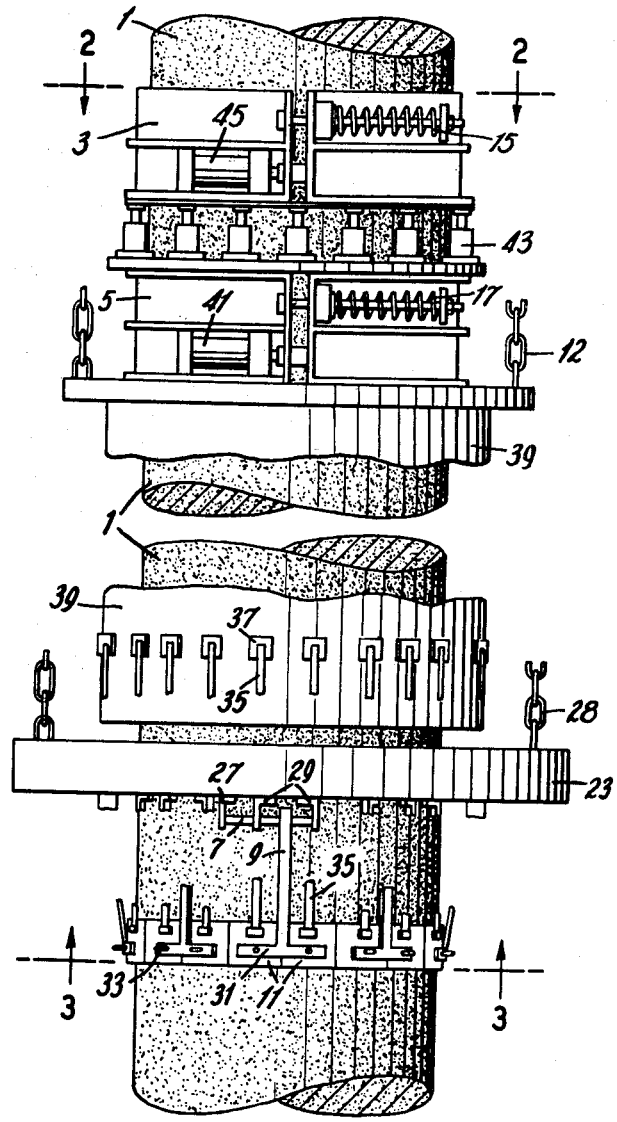
FIGURE 1 shows an elevation view of the contact mechanism of the present invention in combination with apparatus for slipping an electrode.
Figure 2:
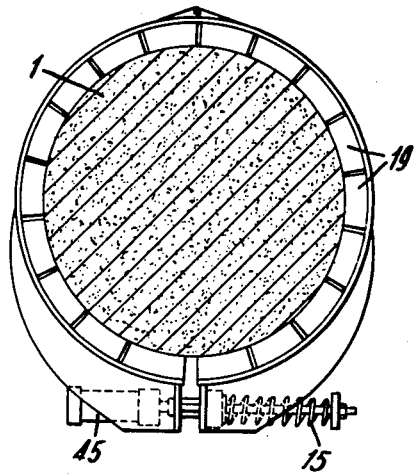
FIGURE 2 is a sectional plan view along 2—2 of FIGURE 1.
Figure 3:
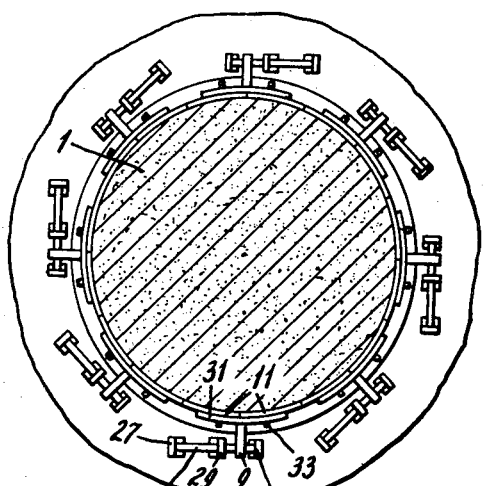
FIGURE 3 is a sectional bottom view along 3—3 of FIGURE 1.

The electrode contact mechanism is arranged and adjusted to support a portion of the weight of the electrode and clamps 3 and 5 are designed so that either one of these clamps, together with the electrode contact mechanism, can support the full weight of the electrode. Clamp 5 is supported in a stationary position by means of chains 12 or other suitable means. Clamps 3 and 5 are substantially identical and each comprises two hinged sections. Springs 15 and 17 respectively maintain both clamps 3 and 5 in a closed position during normal operation whereby friction blocks 19, mounted symmetrically about the electrode on the inner side of both clamps 3 and 5, are caused to forcibly contact the electrode. The friction blocks 19, illustrated in FIGURE 2, are formed of hard formed asbestos, roughened metals or other similarly suitable material, and provide the necessary frictional forces for supporting a portion of the weight of the electrode and permit the use of electrodes having relatively uneven surfaces. The electrode contacts 11 are arranged symmetrically about the electrode and are held in forcible contact therewith by means of rigid arms 9, which are fixedly connected to metal bars 7 by splines 21.

In the embodiment shown in the drawing, the metal bars 7 are fixedly mounted at only one end to ring support member 23 by means of splines 25 and clevis mounts 27. Ring member 23 is supported in a stationary position by means of chains 28 or other suitable means. Supporting mounts 29 spaced away from the fixed ends of the bars 7 provide additional support for the bars 7, however, the rotation of the bars 7 is in no way restrained by the supporting mounts 29 and accordingly the bars 7 can be torsionally rotated by the rigid arms 9 which are connected to the bars 7. Under some circumstances it is convenient to fixedly mount the bars 7 at two positions along their length, instead of at only one end. In this case the rigid arms 9 are connected between the fixed portions of the bars. Alternatively, metal bars 7 can be fixedly mounted at their mid-positions with rigid arms 9 connected to the bars on opposite sides of the mid-positions.

The rigid arms 9 are provided with laterally extending ribs 31 which are disposed opposite the electrode contacts 11. Bolts 33 threadably engage rigid arms 9 at the lateral ribs 31 and are adjusted to forcibly contact the electrode contacts 11. By suitably adjusting bolts 33 the metal bars 7 can be individually torsionally deformed to thereby cause forces proportional to the deformation to be exerted on the electrode contacts 11.

Each metal bar 7 is disposed transverse to the longitudinal axis of the electrode having the portion thereof at which the rigid arm 9 is fixed substantially perpendicular to the radius of the electrode which intersects this portion. By virtue of this arrangement, any forces acting on the electrode contacts are normal to the surface of the electrode.

The bolts 33 can be readily and individually adjusted so that the forces between the electrode contacts and the electrode surface are substantially uniform around the periphery of the electrode and sufficient to provide an efficient electrical contact at the electrode surface while supporting a portion of the electrode weight. Under some circumstances an improved electrical contact can be provided by engaging the bolts 33 to the contact plates 11 through suitable ball-joint type couplings (not shown). The electrode contacts 11 are connected to a suitable source of electrical energy through conductors 35 which are supportably mounted by brackets 37 on electrode shield 39.

In normal operations, metal bars 7 are individually torsionally deformed by adjustment of bolts 33 to thereby cause contacts 11 to forcibly contact the electrode and support a portion of the weight of the electrode. At the same time, clamps 3 and 5 are maintained in a closed position by means of springs 15 and 17 to thereby forcibly contact the electrode. Although both clamps 3 and 5 are normally closed, either one of these upper clamps in conjunction with the lower electrode contact assembly are capable of supporting the full weight of the electrode.

Whenever it is necessary to slip the electrode to replace the consumed portion thereof, a hydraulic cylinder 41, mounted on clamp 5, is actuated to cause spring 17 to release clamp 5 whereby the electrode and clamp 3 move downward, due to the unsupported portion of the weight of the electrode, on hydraulically operable jacks 43 which are mounted between clamps 3 and 5. In its downward movement the electrode is forced through contacts 11 which continue to provide an efficient and uninterrupted electrical contact with the electrode during the slipping operation.

The rate and extent of the downward movement of the electrode is controlled by jacks 43. When the electrode has been slipped the full distance permitted by jacks 43, the electrode is supported in this new position by clamp 3 and the lower electrode contact mechanism. After completion of the slipping operation, hydraulic cylinder 41 is deactuated and spring 17 once again causes clamp 5 to forcibly contact the electrode. Hydraulic cylinder 45 is then actuated to cause clamp 3 to be released from forcible contact with the electrode and jacks 43 are actuated to raise the released clamp 3 to its initial position. When clamp 3 is thus returned to its initial position, hydraulic cylinder 45 is deactuated and clamp 3 is thereupon placed once again in forcible contact with the electrode by means of spring 15; the slipping operation may now be repeated when necessary. Throughout the slipping operation electrode contacts 11 continue in forcible contact with the electrode maintaining an efficient electrical contact therewith and, in addition, limiting the rate of electrode descent thereby avoiding the possibility of damaging stresses on the apparatus.

In FIGURE 4 of the drawing, a portion of the electrode contact mechanism of the present invention is shown separated from the remainder of the apparatus. FIGURE 4 shows torsion bar 7 to be in the form of a metal tube fixedly mounted to clevis mount 27 and rigid arm 9. It is preferred that torsion bars 7 be constructed from a material having an elastic limit in excess of 100,000 p.s.i., e.g. SAE 6150 (0.48 to 0.53 carbon, 0.70 to 0.90 manganese, 0.80 to 1.0 chromium, minimum 0.15 vanadium) and SAE 9245, a high silicon steel (1.8 to 2.2 silicon, 0.43 to 0.48 carbon and 0.7 to 0.95 manganese).

In a specific embodiment of the present invention, used in operation with a 40 inch diameter electrode (initial weight 66,000 lbs.), each torsion bar 7 was a hollow steel tube (SAE 6150) having an inner diameter of 2.00 inches and an outer diameter of 2.50 inches. The length of each bar from its fixed end to the point at which the rigid arm 9 was connected thereto was approximately 17½ inches; the length of the rigid arm from its connection at the hollow bar to the level of the threaded members was about 20½ inches. The complete electrode contact assembly comprised 8 hollow bars, each having a rigid arm connected thereto, and 16 electrode contacts. The electrode contact mechanism was arranged generally as illustrated in the drawing and supported approximately 20,000 pounds of electrode weight. In another operation, the electrode contact mechanism of the present invention has supported up to 80,000 lbs. of electrode weight.

It may be seen from the drawing and the above description that many beneficial results are provided by the relatively inexpensive, compact, and readily adjustable contact mechanism of the present invention.

What is claimed is:

1. An apparatus for providing a continuous electrical contact with an electrode and being capable of supporting a substantial portion of the weight of the electrode which comprises a plurality of metal bars mounted tangentially about the electrode and being adapted to be torsionally deformed; a separate rigid arm fixed to each said bar being adapted to torsionally deform the bar affixed thereto when displaced in a direction transverse to said affixed bar; electrode contact means spaced away from said metal bars being in contact with the electrode and being engaged to said rigid arms; adjusting means engaged to said rigid arms being adapted to displace said rigid arms to thereby torsionally deform said bars and provide a force exerted through said rigid arms on said contact means whereby said contact means is caused to forcibly contact the electrode; and means for connecting said electrode contact means to a suitable source of electrical energy.

2. An apparatus for providing a continuous electrical contact with an electrode and being capable of supporting a substantial portion of the weight of the electrode which comprises a plurality of metal bars symmetrically disposed about the electrode adjacent thereto and transverse to the longitudinal axis thereof; each said bar being fixedly held at only one portion thereof and extending to form an acute angle with the radius of the electrode passing through said fixed portion and extending to perpendicularly intersect a radius of said electrode; a separate rigid arm fixed to each said bar at the portion thereof perpendicularly intersecting a radius of the electrode, each of said rigid arms extending downwardly from the bar affixed thereto; electrode contact means spaced downwardly from said metal bars being in contact with the electrode and being disposed between said rigid arms and the electrode; adjusting means separately engaged to each rigid arm and engaging said contact means for increasing the distance therebetween to an extent whereby due to the resultant torsional deformation of said metallic bars said electrode contact means is caused to forcibly contact the electrode; and means for connecting said electrode contact means to a suitable source of electrical energy.

3. An apparatus in accordance with claim 2 wherein said metal bars comprise a plurality of hollow steel bars having an elastic limit in excess of 100,000 p.s.i.

4. An apparatus in accordance with claim 2 wherein said adjusting means comprises a plurality of threaded members threadably engaging said rigid arms and extending therethrough normal to the electrode surface to forcibly contact said electrode contact means.

5. An apparatus for providing a continuous electrical contact with an electrode and being capable of supporting a substantial portion of the weight of the electrode which comprises an annular spuport member surrounding a lower portion of said electrode and arranged in central alignment therewith; a plurality of metal bars symmetrically disposed about the electrode adjacent thereto and transverse to the longitudinal axis thereof; each said bar being fixedly connected at only one portion thereof to said support member and extending to form an acute angle with the radius of the electrode passing through said fixed portion and extending to perpendicularly intersect a radius of said electrode; a separate rigid arm fixed to each of said bars at the portion thereof perpendicularly intersecting a radius of the electrode, each of said rigid arms extending downwardly from and transverse to the bar affixed thereto; electrode contact means spaced downwardly from said metal bars being in contact with the electrode and being disposed between said rigid arms and the electrode; adjusting means separately engaged to each rigid arm and engaging said contact means for increasing the distance therebetween to an extent whereby due to the resultant torsional deformation of said metallic bars said electrode contact means is caused to forcibly contact the electrode; and means for connecting said electrode contact means to a suitable source of electrical energy.

References Cited in the file of this patent

UNITED STATES PATENTS

| | | |
|---|---|---|
| 2,788,459 | Gretner | Apr. 9, 1957 |
| 2,889,387 | Boron et al. | June 2, 1959 |